UNITED STATES PATENT OFFICE.

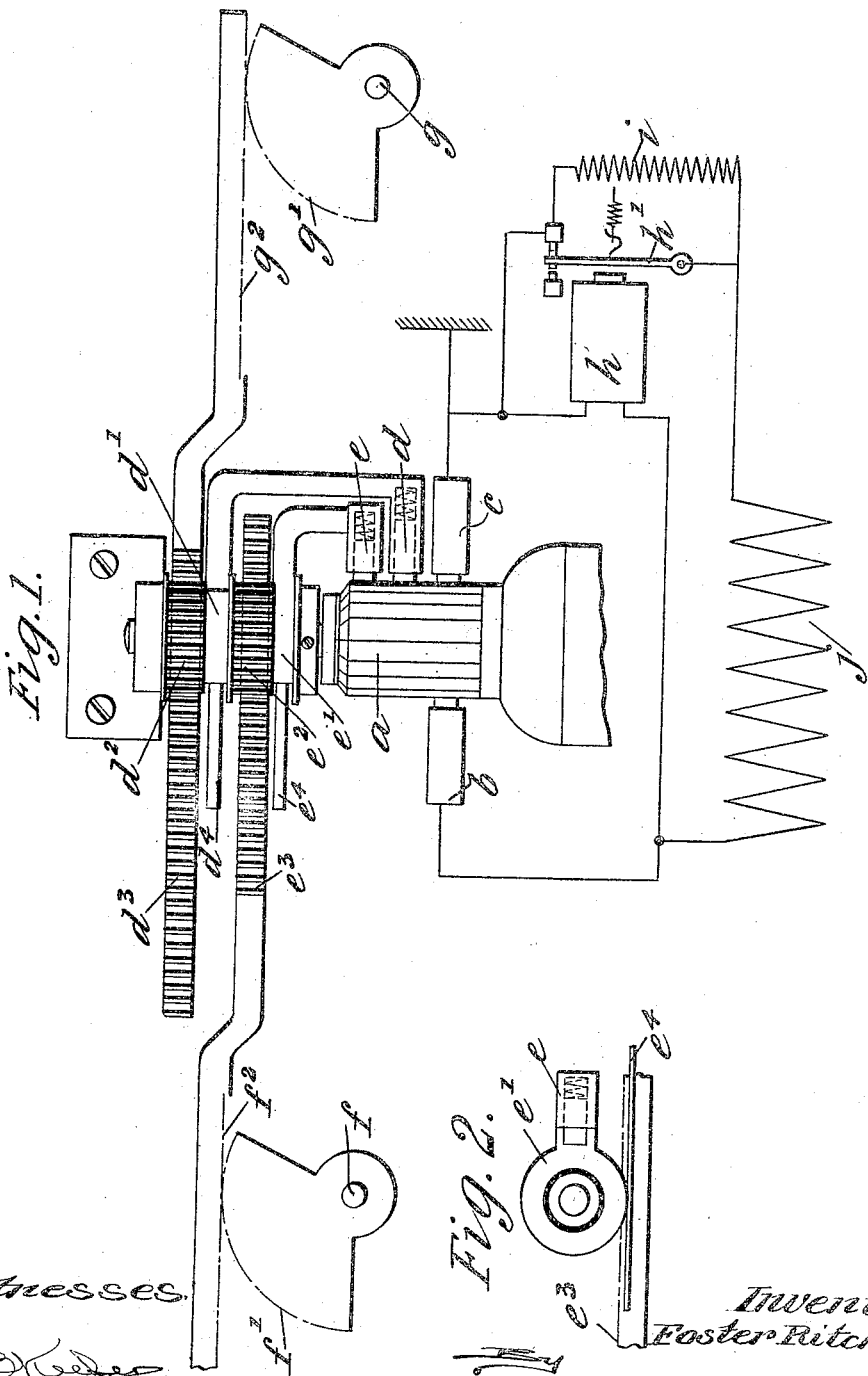

FOSTER RITCHIE, OF ACTON, ENGLAND.

TELAUTOGRAPH.

No. 894,165.

Specification of Letters Patent.

Patented July 21, 1908.

Application filed April 27, 1908. Serial No. 429,450.

*To all whom it may concern:*

Be it known that I, FOSTER RITCHIE, a subject of the King of Great Britain, residing at 36 King Edwards Gardens, Acton, in the county of Middlesex, England, electrical engineer, have invented certain new and useful Improvements in Telautographs, of which the following is a specification.

This invention relates to telautograph systems such as for example is described in specification to British Patent No. 24048 of 1899 and has for its main objects to dispense with the use of batteries and the potentiometer method of varying the line currents, and at the same time to enable telautographs to be worked from any available current supply network whether direct or alternating, or independently of any such network. The means for varying the line currents which is contemplated by the present invention therefore excludes among others that potentiometer arrangement in which the variable potential is derived from the armature of a continuous current motor by means of an additional brush movable around the commutator in accordance with the movement of the transmitting pencil.

With the above and other objects in view, the line currents in telautograph systems are by the present invention supplied by an electric generating machine, which may be driven electrically or otherwise, instead of by batteries, and the variation in the line currents is produced by variations of the voltages applied to the line circuits consequent on the changing position of the transmitting pencil. For this purpose a continuous current generator, which may conveniently be a motor-generator or rotary converter supplied with current on the motor side from any suitable source, is provided with three brushes, one of which remains stationary on the commutator at or near the neutral axis while the other two are movable around the commutator and are connected electrically with the line circuits and mechanically with the transmitting pencil in the same manner as the variable rheostats of British Patent No. 24048 of 1899. It will be seen that with this arrangement the voltage between the fixed brush and each of the movable brushes and consequently the line currents will depend upon the position of the transmitting pencil.

Figure 1 is a diagrammatic view showing an organization embodying the features of the invention. Fig. 2 is a detail view showing one of the brush holders, a rack gear and collector.

The commutator of the generator $a$ is shown as provided with two oppositely disposed brushes $b$, $c$, which will be called the fixed brushes, although they may be carried by brush holders having the usual provisions for adjustment, and with movable brushes $d$, $e$, which are so mounted and geared or connected with the shafts $f$, $g$ to which the pencil arms of the telautograph are attached, that they move around the commutator in accordance with the movement of the pencil.

The brush $c$ is earthed and the brushes $d$, $e$ connected with the respective line wires, so that the voltages applied to the line circuits at any moment are the potential differences between the brush $c$ and the brushes $d$, $e$ respectively, these potential differences varying continuously with the movements of the brushes $d$, $e$ around the commutator, namely with the movement of the pencil.

In the arrangement shown, the brushes $d$, $e$ are carried by holders $d'$, $e'$ revoluble around the armature spindle, but insulated therefrom and formed with or secured to pinions $d^2$, $e^2$ which are actuated by suitably guided racks $d^3$, $e^3$, respectively. The rack bars are actuated by the pencil shafts $f$ $g$ by means of similar gears $f'$ $f^2$ and $g'$ $g^2$.

The connections of the brushes $d$, $e$ to lines are established through the brushes or collectors $d^4$, $e^4$ bearing on the revoluble brush holders $d'$, $e'$.

As it is important that the voltage between the fixed brush $c$ and either of the movable brushes $d$, $e$ should not vary at all, or at any rate not appreciably, with change of position of the other movable brush, and also when the capacity of the generator is not greatly in excess of the load which may be thrown on it, it is advisable for this purpose to provide means for insuring a practically constant fall of potential around the commutator under all conditions of working. This may be done as shown in Fig. 1 by providing a second main brush $b$ which is fixed relatively to the brush $c$ say diametrically opposite to it on the plane of commutation, and including in a circuit connecting these brushes an electric relay $h$, the armature $h'$ of which is arranged in one of its limiting positions to shunt a resistance $i$ which may be connected in series with the field coils $j$ of the generator as shown.

The relay spring is adjusted so that when the voltage between the brushes $b$, $c$ reaches a predetermined value the relay armature $h'$ will be attracted and the magnetic flux through the armature and consequently the terminal voltage reduced, either as shown in Fig. 1 by the introduction of the resistance $i$ into the field circuit. The reduction of the voltage immediately restores the original conditions, and thus by a vibratory action of the relay armature, the potential difference between the brushes $b$, $c$ and therefore the fall of potential around the commutator is kept constant or sufficiently constant for the purpose. The generator may be self excited as shown or it may be excited from an independent source, as for example from the supply network in the case of a continuous current supply.

The relay may alternatively be arranged to operate a resistance in series with the motor, thereby varying the supply of current to the motor according to the energy required to keep the voltage constant at the fixed brushes of the generator.

In the voltage regulating device above described, it has been assumed that the motor is a constant speed machine such as a synchronous alternating current motor or a continuous current motor having suitable provision for governing its speed. Another method of regulating the voltage of the generator is to provide its field magnet with two additional windings which are included in the respective line circuits so that as the currents in the lines increase or diminish the generator field is correspondingly augmented or weakened. This method of regulation is applicable both to generators driven at constant speed and to generators the speed of which may vary with the load or for other reasons, but is open to the objection that it involves added resistances in the line circuits and consequently a reduction of the length of line over which the apparatus may be worked. By these or other suitable means the potential difference between the main brushes may be maintained constant and consequently the potential difference between the fixed brush and either of the movable brushes made independent of any change of position of the other movable brush.

Having thus described the nature of my said invention and the best means I know of carrying the same into practical effect, I claim:—

1. In a telautograph, an electric generator having a commutator with fixed and movable brush means coöperating therewith, the movable brush means being shiftable around the commutator and always out of contact with the fixed brush means, telautographic devices operatively associated with the movable brush means, and means for producing line currents varying in intensity in accordance with the positions of the telautographic devices and thereby continuously modifying the voltage applied to the line circuit.

2. In a telautograph, an electric generator provided with a commutator having a pair of automatically relatively shiftable brushes and fixed brushes, one of the latter being connected to earth and both always out of contact with the shiftable brushes and telautographic devices operatively associated with the shiftable brushes, the shiftable brushes being moved in accordance with the movements of the telautographic devices to vary the voltage applied to the line circuits.

3. In a telautograph system, an electric generator provided with a commutator having a pair of brushes movably coöperating therewith and fixed brushes, the movable brushes being always out of contact with the fixed brushes, one of the latter being connected to earth, movable telautographic devices operatively associated with the movable brushes, the movable brushes being movable in accordance with the movements of the telautographic devices to vary the voltage applied to the line circuits, and means for maintaining a constant fall of potential around the commutator of the generator by making the field of the generator dependent on the line currents.

4. In telautograph systems, an electric generator, stationary brushes coöperating with the commutator thereof, brushes movable with relation to the said commutator and to said stationary brushes, pencil shafts, means operatively connecting the movable brushes with the corresponding pencil shafts, and current collectors coöperating with the movable brushes.

5. In telautograph systems an electric generator, stationary brushes coöperating with the commutator thereof, brushes movable with relation to the said commutator and to said stationary brushes, telautograph devices, means operatively connecting the movable brushes with the corresponding telautograph devices and current collectors coöperating with the movable brushes.

In testimony whereof I have signed my name to this specification in the presence of two subscribing witnesses.

FOSTER RITCHIE.

Witnesses:
JOSEPH MILLARD,
WALTER J. SKERTEN.